United States Patent
Johansson et al.

(10) Patent No.: US 6,333,936 B1
(45) Date of Patent: Dec. 25, 2001

(54) METHOD AND APPARATUS FOR ALLOCATING PROCESSING RESOURCES

(75) Inventors: Staffan E. Johansson; Nils T. E. Jönsson; Patrik J. E. Rynbäck; Peter Johansson; Christoffer Andersson, all of Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/069,168

(22) Filed: Apr. 29, 1998

(51) Int. Cl.$^7$ ........................................................ H04J 3/14
(52) U.S. Cl. .................... 370/449; 370/252; 370/270; 370/462
(58) Field of Search ..................... 370/209, 270, 370/320, 342, 358, 25.2, 441, 449, 479, 453, 455, 457, 462

(56) References Cited

U.S. PATENT DOCUMENTS

| | | | |
|---|---|---|---|
| 4,713,806 | * 12/1987 | Oberlander et al. | 370/358 |
| 4,720,850 | 1/1988 | Oberlander et al. | 379/90 |
| 5,440,563 | * 8/1995 | Isidoro et al. | 370/270 |
| 5,838,968 | * 11/1998 | Culbert | 395/674 |
| 5,870,378 | * 2/1999 | Huang et al. | 370/209 |
| 5,890,011 | * 3/1999 | Abbondanzio et al. | 395/829 |

FOREIGN PATENT DOCUMENTS

| | | | |
|---|---|---|---|
| 0 658 062 A | 6/1995 | (EP) | H04Q/3/58 |
| 95/34974 A | 12/1995 | (WO) | H04L/12/24 |
| 95/34975 A | 12/1995 | (WO) | H04L/12/24 |
| 97/22213 A | 6/1997 | (WO) | H04Q/3/00 |

* cited by examiner

*Primary Examiner*—Dang Ton
*Assistant Examiner*—Shick Hom
(74) *Attorney, Agent, or Firm*—Nixon & Vanderhye P.C.

(57) ABSTRACT

A pool of resource units is configured using a structure having plural levels including first level and second level resource blocks. Each first level resource block corresponds to an individual resource unit, where an individual resource unit is the smallest resource that can be allocated from the resource pool. The first level resource blocks are provided in groups. Each second level resource block corresponds to one of the groups of the first level resource blocks. The second level resource blocks are also provided in groups forming a next higher level of the resource pool. If a request is made for a first level resource block, an available first level resource block is allocated. If a first level resource block is not available, then an available first level resource block is created by converting a second level resource block into a corresponding group of first level resource blocks. One of the converted first level resource blocks is then allocated to the request. Resource blocks are restored to the resource unit pool structure first to any incomplete first level resource block grouping. If that returned block completes the grouping, a new second level resource block is made available. The resource pool may be reconfigured as needed to ensure an efficient configuration.

37 Claims, 11 Drawing Sheets

EFFICIENT RESOURCE ALLOCATION

LEVEL N
.
.
.
.
LEVEL 3
RESOURCE BLOCKS

LEVEL 2
RESOURCE BLOCKS

LEVEL 1
RESOURCE BLOCKS

RESOURCE UNIT HIERARCHY

EACH LEVEL 1 RESOURCE BLOCK = 1 DATA PROCESSING HW OR SW RESOURCE UNIT

Fig. 1  EACH LEVEL 2 RESOURCE BLOCK = 2 LEVEL 1 RESOURCE BLOCKS
EACH LEVEL 3 RESOURCE BLOCK = 2 LEVEL 2 RESOURCE BLOCKS

LEVEL N
.
.
.
.
LEVEL 3
RESOURCE BLOCKS

LEVEL 2
RESOURCE BLOCKS

LEVEL 1
RESOURCE BLOCKS

FRAGMENTED RESOURCE ALLOCATION

Fig. 2

⊗ = CURRENTLY ALLOCATED RESOURCE BLOCK
☒ = AVAILABLE RESOURCE BLOCK

METHOD AND APPARATUS FOR ALLOCATING PROCESSING RESOURCES

FIELD OF THE INVENTION

The present invention relates to allocating resources in general, and more particularly, to allocating various data, signal, and/or communications processing resources.

BACKGROUND AND SUMMARY OF THE INVENTION

In certain environments, data, signal, and communication processing resources may be dedicated for use by particular hardware elements, software elements (e.g., application programs), and human operators, each of which may be generally viewed as a "resource user." While such resource dedication is convenient and also ensures that the necessary or otherwise appropriate resources are available whenever the resource user requests them, this one-to-one, dedicated relationship between a resource and a resource user is inefficient. This inefficiency is primarily due to the fact that dedicated resources are most often underutilized since the resource user typically uses its dedicated resource less than 100% of the time.

The present invention employs a more efficient resource allocation approach in which resources are pooled and allocated on an "as needed" basis. In other words, in response to a resource request, a resource (if available) is "withdrawn" from a pool of resources and provided to the requesting resource user. When the resource user is finished using that resource, it is returned to the resource pool. Efficiency is increased because (1) the number of resource users may be considerably larger than the number of resources in the pool and (2) resources are removed from the pool only when they are actually used.

In order for a pooled resource system to work smoothly, the allocation and return of resources from and to the resource pool needs to be managed in an effective and efficient manner. Efficient management is more challenging when the pool of resources as well as the resource requests are not all the same. For instance, one resource request may be for a relatively small resource while another resource request might be for a relatively large resource. Moreover, resource requests may also differ in parameters other than size.

The present invention resolves these issues in part by imposing a structure on the resource pool including specific rules regarding how resources are to be allocated from the pool. Those rules may vary depending on the end application that requests and uses the resources. One example (but non-limiting) structure is the resource hierarchy shown in FIG. 1. The hierarchy includes a plurality of levels or tiers with each level having plural nodes representing a resource block at that level. The data structure is organized in such a way that it "mirrors" the physical resources in terms of how those physical resources are linked or grouped. The physical resources are configured, reconfigured, allocated, de-allocated, organized, and reorganized using the data structure.

Figure 1:
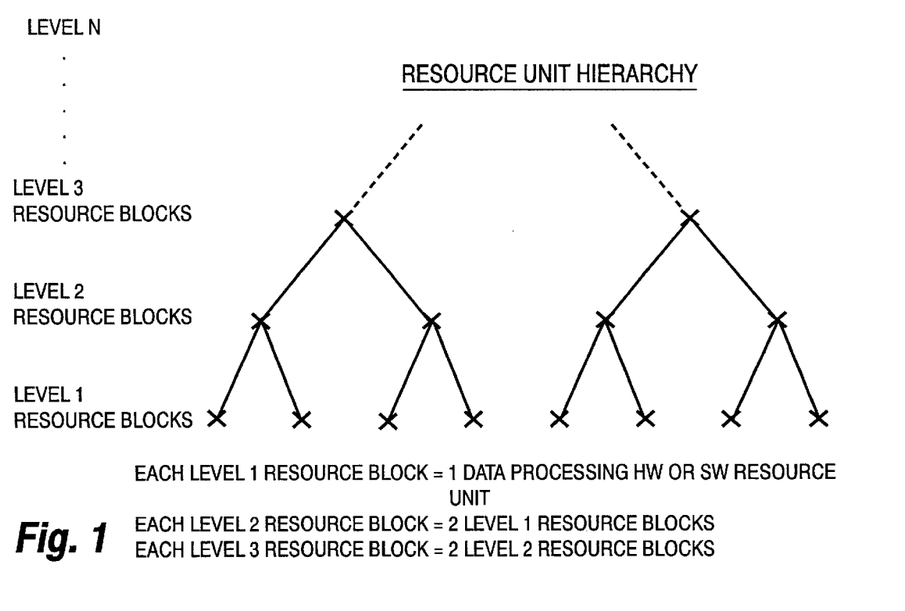
FIG. 1 is a diagram showing a resource unit hierarchy which is one example structure that may be imposed upon a resource pool.

The method of the present invention is general with respect to the number of lower level resource units that together forms a higher level resource unit. Level 1 resource blocks correspond as shown in FIG. 1 to one data processing resource unit, where a resource unit may comprise hardware and/or software. Each level 2 resource block corresponds to a group (in this example two) of consecutive level 1 resource blocks. Similarly, each level 3 resource block of the resource hierarchy corresponds to a group of consecutive level 2 resource blocks.

Thus, if a resource request requires four data processing resource units, a single level 3 resource block would be allocated to that request. A level 3 resource block corresponds, in this example, to two level 2 resource blocks which in turn corresponds to four level 1 resource blocks equivalent to the four data processing resource units.

Figure 2:
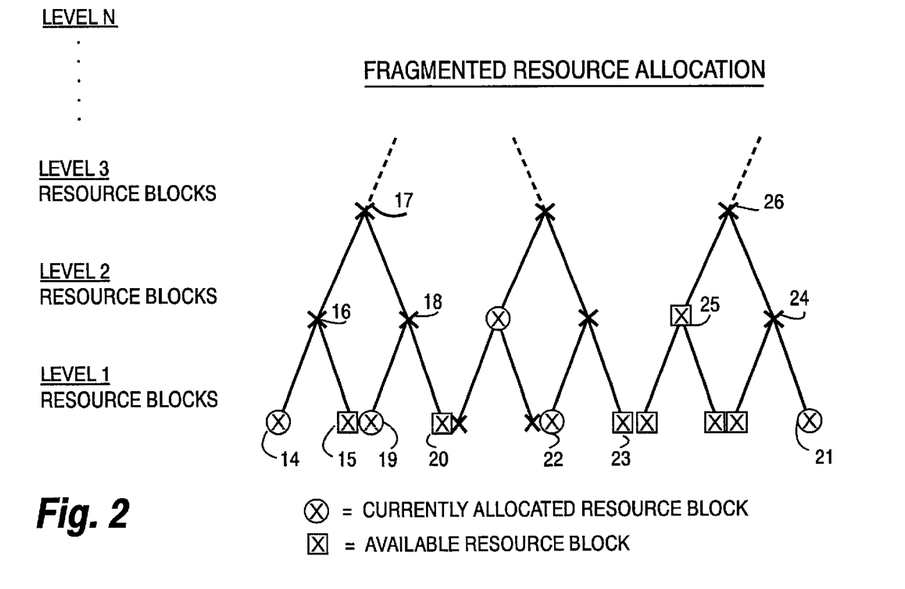
FIG. 2 is a diagram showing a fragmented resource allocation using the resource unit hierarchy from FIG. 1.

While resources may be allocated from and returned to such a hierarchical structure in random fashion, such an approach may ultimately lead to inefficiencies. In particular, the initial, ordered structure of the resource hierarchy may become fragmented after several resource block allocations and returns. Unfortunately, because of the fragmentation, resource blocks at certain levels cannot be fully utilized. For example, FIG. 2 shows the resource hierarchy of FIG. 1 with a fragmented resource allocation configuration. Circled resource blocks correspond to a currently allocated resource block, and a square enclosing a resource block represents a currently-available resource block. Because level 1 resource block 14 is currently allocated, level 2 resource block 16, logically linked to both level 1 resource blocks 14 and 15, cannot be allocated. A "domino effect" occurs—since level 3 resource block 17 is linked to resource blocks 16 and 18, level 3 resource block 17 cannot be currently allocated even if level 2 resource block 18 were currently available.

On the other hand, if the currently-allocated resource block 19 had been allocated from currently-available resource block 15, the level resource block 18 would have been available for allocation. Similarly, if currently-allocated, level 1 resource block 21 was not allocated, and instead the currently-available level 1 resource block 23 was assigned to the resource request, the currently-unavailable level 2 resource block 21 would be available. The level 2 resource block 21 could then be combined with the level 2 resource block 25 to make available the level 3 resource block 26. Accordingly, as a result of fragmented/inefficient resource allocation at lower levels in the hierarchy, it may be difficult to provide a higher level resource block to a resource request even though there are sufficient, available resources in the resource pool to accommodate the higher level resource request.

Therefore, it is an object of the present invention to overcome this kind of inefficiency by providing a resource pool structure including a data structure reflecting the free resources in the pool and that permits organized and efficient but still flexible allocation and de-allocation of resources.

It is a further object of the present invention to ensure that resource units are evenly utilized in a resource pool.

It is another object of the present invention to selectively re-allocate resources among the resource users to free other resources that can be used to form higher level resource blocks in order to meet a particular resource demand or to simply make available higher level resource blocks.

It is another object of the present invention to determine and implement a resource pool structure data structure, mirroring the free resources in the resource pool, that best suits current resource demands.

The present invention configures a pool of resource units using a logical structure that includes first level and second level resource blocks. The terms "configure resources" or "configuration of resources" refer to a data structure which is organized to reflect or represent actual or physical resources. However, the actual resources themselves are not necessarily configured in a resource hierarchy like that shown in FIG. 1. Each first level resource block corresponds to an individual resource unit, where an individual resource unit is the smallest resource that a resource handler allocates from the resource pool. The first level resource blocks are provided in groups that form a lowest level of the resource pool structure. Each second level resource block corresponds to one of the groups of the first level resource blocks. For example, two first level resource blocks form a first level resource block group logically linked to a second level resource block. The second level resource blocks are provided in groups and form a next higher level of the resource pool structure.

Resources are allocated from the resource unit pool in an efficient manner. For example, if a request is made for a first level resource block, an available first level resource block is allocated from a partially-allocated, first level resource group where one or more first level resource blocks are currently already allocated. If a first resource block is not available, then an available first level resource block is created. In this case, a second level resource block is converted into a corresponding group of first level resource blocks, and one of the converted, first level resource blocks is then allocated to the request. A similar procedure is used at a next higher level, i.e., at third level resource blocks and groupings. In other words, if a first resource block is not available at the first level and cannot be obtained by conversion of a resource block at the second level, a third level resource block is converted into a corresponding group of second level resource blocks; a converted second level resource block is converted into a corresponding group of first level resource blocks; and one of the converted first level resource blocks is allocated.

Resource blocks are also restored to the resource unit pool structure efficiently. For example, a returned first level resource block is restored to a partially-allocated, first level resource block grouping. If that returned block completes that grouping, a new, second level resource block is made available. In one preferred embodiment, when a resource block is restored, the physical resource is restored to the same position in the resource array as from where it was originally allocated. However, the corresponding resource block in the data structure is placed last in a list of free resource blocks. This ensures that each of the physical resources in the pool is used about the same amount over time.

The resource pool is managed by a resource handler which stores in memory a data structure that mirrors the current status (free or occupied) of the resources in the resource pool. The resource pool structure represents and maintains the logical relation between resource units/blocks. For example, the data structure may include multiple lists, each list corresponding to a resource block level and each record/entry in the list representing one free resource unit. The list does not include allocated resource units.

To properly manage the resource unit pool or to otherwise meet a particular a resource request/demand, a resource handler may re-allocate resource units by moving a resource user from one resource block to another at that same level in order to create additional resource blocks at the next higher level. The resource handler may also receive traffic statistics about the number of requests for different level resource blocks collected by a statistics analyzer and determine which level in the resource unit pool structure receives the greatest number of requests, i.e., the most popular level. In an example communication system, assume the system capacity is eight voice calls or two data calls. Most of the calls in the system during busy hours are voice calls. During busy hours, if the whole system capacity is allocated for data calls, no voice calls can be made resulting in an insufficient subscriber service level in the area. By restricting the use of the transmission capacity, at least a minimum level of service for data calls and voice calls can be assured. The resource handler then re-allocates resource units in the current resource pool configuration to create additional resource blocks at the most popular level.

The present invention has particularly advantageous application to communications systems, and in particular, to radio communications systems. A preferred example embodiment of the present invention is disclosed in the context of a wide band, code division multiple access (WCDMA), spread spectrum, radio communications system. Of course, as evident from the above description, the present invention has general applicability and is not limited to communications environments. Various features and advantages of the present invention, some of which have been described above, will be disclosed in further detail in conjunction with the drawings and detailed description.

BRIEF DESCRIPTION OF THE DRAWINGS

These and other objects, features, and advantages of the present invention will now be described in conjunction with the drawings in which.

DETAILED DESCRIPTION OF THE DRAWINGS

In the following description, for purposes of explanation and not limitation, specific details are set forth, such as particular embodiments, data flows, techniques, etc. in order to provide a thorough understanding of the present invention. However, it will be apparent to one skilled in the art that the present invention may be practiced in other embodiments that depart from these specific details. For example, while a preferred example embodiment of the present invention is described in the context of an example of a WCDMA radio network, those skilled in the art will appreciate that the present invention has wide application to communications and data processing systems. In other instances, detailed descriptions of well-known methods, interfaces, devices, and signaling techniques are omitted so as not to obscure the description of the present invention with unnecessary detail.

Figure 3:
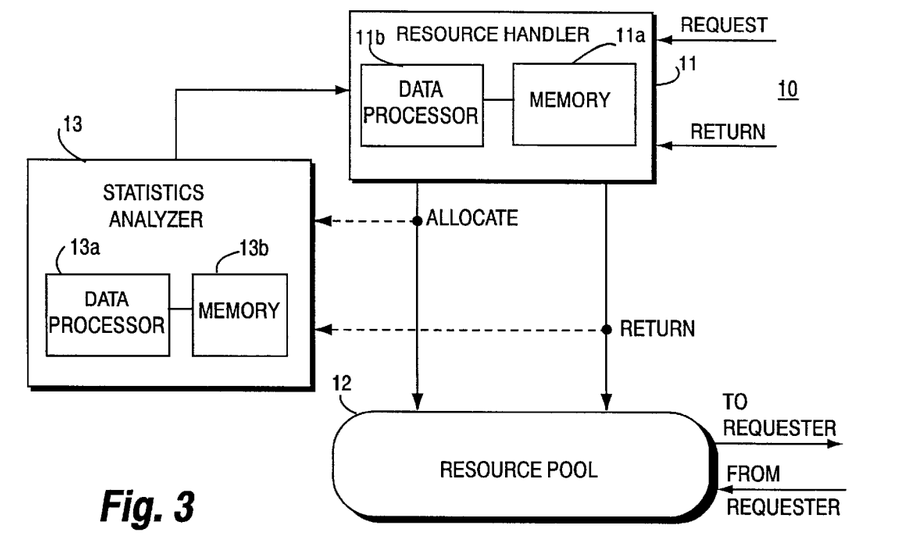
FIG. 3 is a resource management system in accordance with a general embodiment of the present invention.

Referring to FIG. 3, a general embodiment of the present invention as a resource management system 10 configures a data structure mirroring the free resources in a pool of resources 12 using a hierarchical or other layered structure. One example hierarchical structure is shown in FIG. 1 including resource blocks at various levels one, two, three, . . . N. Resource blocks at each level are configured into groups, each group linked to one resource block at the next higher level. Thus, in the example in FIG. 1, two level 1 resource blocks form a level 1 resource block group. A single level 2 resource block is linked to one of the level 1 resource block groupings. A single level 3 resource block is linked to a level 2 resource block grouping (corresponding in the example shown in FIG. 1) to two consecutive level 2 resource blocks. Of course, groupings and/or structures other than that shown in FIG. 1 may be employed.

The resource management system 10 shown in FIG. 3 also includes a resource handler 11 and a statistics analyzer 13 in order to efficiently and otherwise optimally manage the allocation and return of resources from resource pool 12. The resource handler 11 includes a memory 11a and a data processor 11b. The statistics analyzer 13 also includes a data processor 13a and suitable memory 13b. As explained above, the statistics analyzer 13 monitors one or both of the allocations and returns of resources from/to resource pool 12. The statistics analyzer provides this information in an appropriate format to resource handler 11 which may, depending upon an analysis of the statistics, reorganize or otherwise reconfigure the resource pool hierarchy. Although the resource handler 11 and statistics analyzer 13 are shown as separate elements, each having its own data processor and memory, those skilled in the art will appreciate that they may be implemented using common data processing circuitry and memory.

In general, (though not always), the resource handler 11 attempts to allocate resource blocks to the extent possible so that higher level resource blocks are preserved for allocation. Consequently, the resource handler 11 first tries to allocate resource blocks from a grouping in which another resource block has already been allocated. Only when all of the resource blocks in a partially-allocated grouping are all currently allocated does the resource handler 11 draw upon another resource block group at that same level. When there are no available groups at the request resource level, the resource handler 11 converts an available resource block from a next higher level (again from a group that is currently partially-allocated if possible) into a group at the requested resource block level. Then one of the converted resource blocks is allocated to the resource request. If there are no available resource blocks for conversion at that higher level, then the resource handler moves to the yet next, higher level and makes the necessary conversions through two levels to provide the requested resource block.

Similarly, if a resource block is returned to the resource pool 12, the resource handler 11 returns the resource block, with its status changed from occupied to free, to the same position in the resource array as from where it was allocated. Moreover, the resource handler 11 also endeavors, in a preferred example embodiment, to return resources in a manner such that the same resources are not always allocated, e.g., a round robin selection and return. Instead, utilization of resource blocks at each level is substantially equally distributed over time amongst all of the resource blocks at that level.

Because the allocation and restoration of resource blocks to the resource pool hierarchy typically depends on external factors, the resource handler 11 preferably periodically, or when needed, reconfigures the resource pool 12 to attain a more efficient configuration. For example, a resource block currently allocated may be de-allocated and another resource block at that same level in a more efficient position in the hierarchy may be reallocated to that request thereby making available higher level resource blocks for future allocation.

Figure 4:
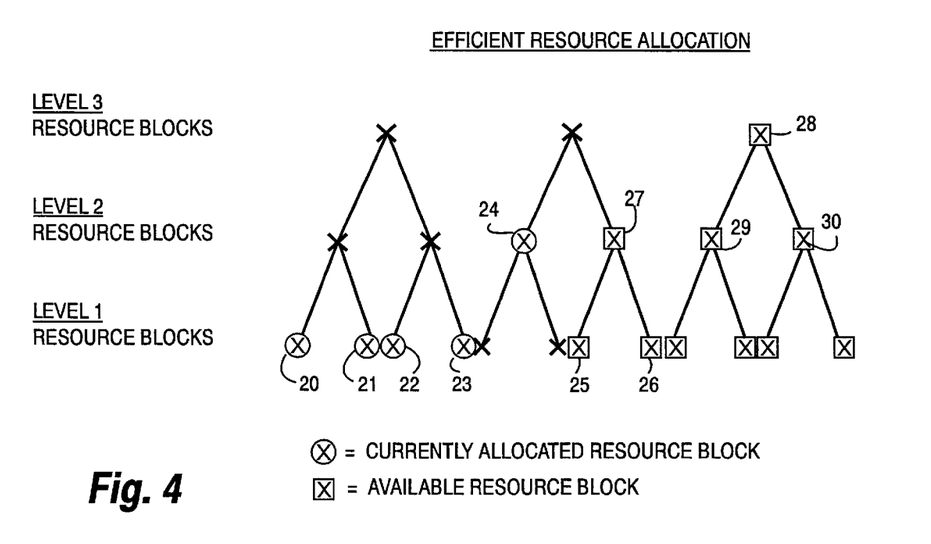
FIG. 4 is an example of an efficient resource allocation for the resource unit hierarchy of FIG. 1 in accordance with one example application of the present invention.

FIG. 4 shows a resource hierarchy configuration example in which resources are efficiently allocated using the present invention in contrast to the inefficient, fragmented resource block allocation shown in FIG. 2. Level 1 resource blocks are allocated in sequential fashion from left to right across each hierarchical level. In this example, level 1 resource blocks 20–23 are currently allocated. The next two level 1 resource blocks are allocated to a level 2 resource block 24. In response to a resource request for a level 1 or a level 2 resource block, the resource handler 11 would draw upon level 1 and level 2 resource blocks 25–27, respectively. As a result of this efficient resource allocation, a level 3 resource block 28, or alternatively, two additional level 2 resource blocks 29 and 30, is (are) available for higher level request allocations.

Figure 5:
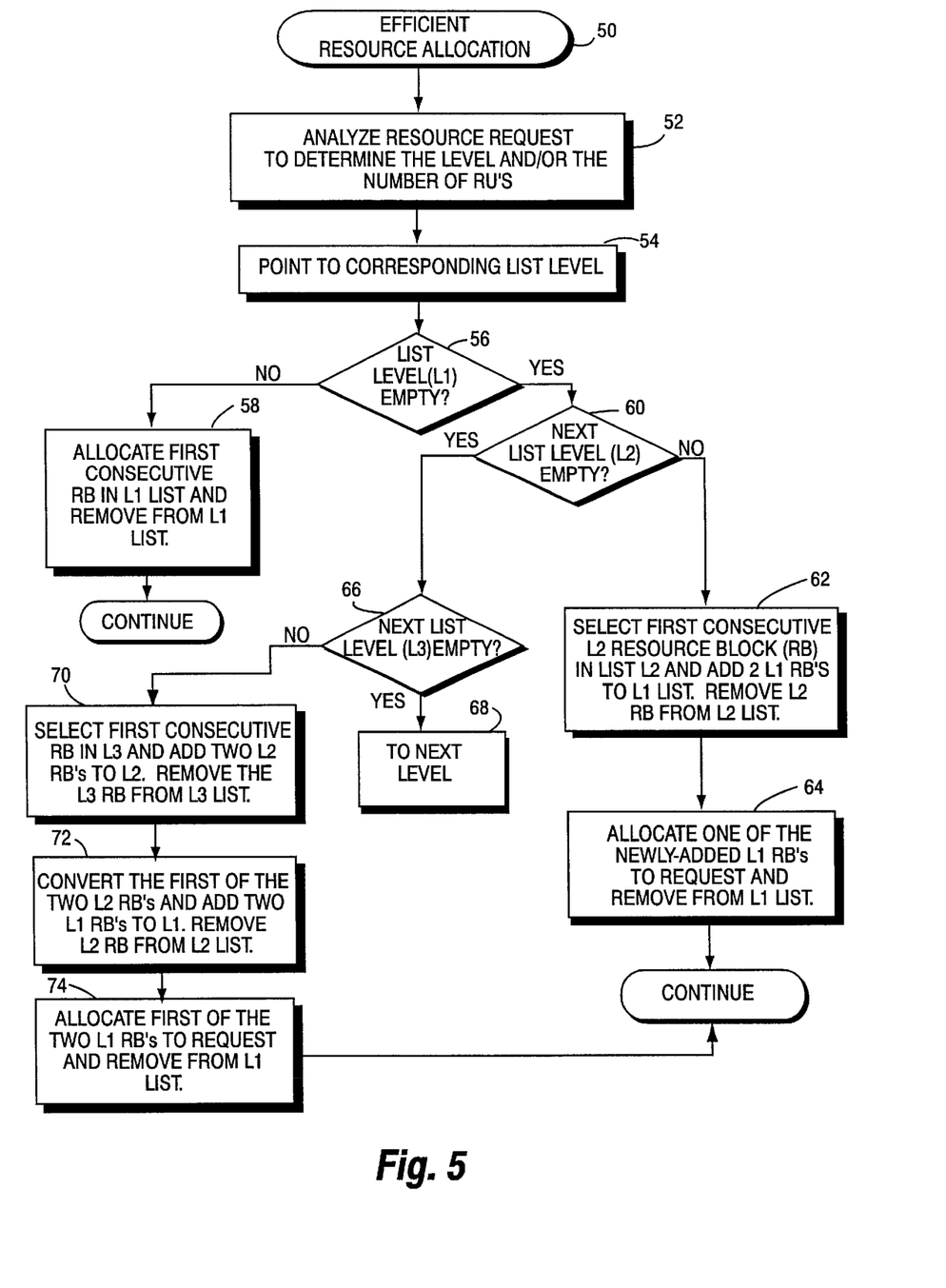
FIG. 5 is a flowchart diagram illustrating one set of example procedures for efficiently allocating resources in accordance with one aspect of the present invention.

FIG. 5 shows a flowchart diagram illustrating example procedures (entitled Efficient Resource Allocation, at block 50) that may be followed by the resource handler 11 for efficiently allocating resources from resource pool 12 in accordance with one preferred, but nevertheless example, embodiment of the present invention. The resource handler 11 analyzes an incoming resource request to determine the level of the request in the resource pool hierarchy or other structure (Block 52). For example, the resource request may require a certain number of resource units. Using the example hierarchical configuration shown in FIG. 1, if the request is for one resource unit, a level 1 resource block must be allocated; if the request is for two resource units, a level 2 resource block must be allocated; and if the request is for four resource units, then a level 3 resource block must be allocated, and so forth.

The resource pool configuration is mirrored in a list-based data structure stored in memory 11a accessed by resource handler 11. A corresponding list is maintained for each level in the resource pool configuration structure. A detailed example of such a list-based data structure will be described below in conjunction with the example embodiment of FIGS. 8 and 9.

Based on that analysis, the resource handler 11 points to the corresponding level list (block 54) and decides if the corresponding list is empty (block 56). The list from level 1 (L1) is used as an example. In other words, the L1 list of resources in the resource pool 12 stored in the resource handler memory 11a is checked to detect any L1 resource blocks, i.e., from an L1 grouping with one or more resource blocks currently allocated.

If the L1 list is not empty, the resource handler 11 allocates the first available L1 resource block in the L1 list and removes it from the L1 list in memory 11a (block 58). On the other hand, if the L1 list is empty, the resource handler 11 determines whether the next level list, level 2 (L2) in this example, is empty (block 60). If there are entries detected in the L2 list, the resource handler 11 removes the first (if any) level 2 resource block from list L2 and adds a group of two (in this example) level 1 resource blocks to the L1 list (block 62). More generally, the resource handler 11 creates a group of level 1 resource blocks from a single level 2 resource block. One of the newly-added level 1 resource blocks is allocated by the resource handler 11 to the request and removed from the L1 list in resource handler memory 11a (block 64).

Alternatively, if there are no entries currently shown at list level L2 in memory 11a (block 60), the resource handler 11 determines whether the next list level, in this example the list for level 3 (L3) in the hierarchy, is empty (block 66). If not, the resource handler 11 selects the first available resource block from list L3 and converts that L3 resource block into a group of level 2 resource blocks (in this example two). This conversion effectively adds two L2 resource blocks to the L2 list and removes the L3 resource block from the L3 list (block 70). The resource handler 11 converts the first of the two, newly-created L2 resource blocks into a group of L1 resource blocks thereby adding two resource block entries to the L1 list (block 72). The converted L2 resource blocks accordingly removed from the L2 list in resource handler memory 11a. The resource handler 11 then allocates the first of the two newly-created L1 resource blocks to the resource request, and removes that L1 resource block from the L1 list in memory 11a. If the L3 list is empty, control proceeds to the next level (block 68), and similar procedures are performed.

Figure 6:
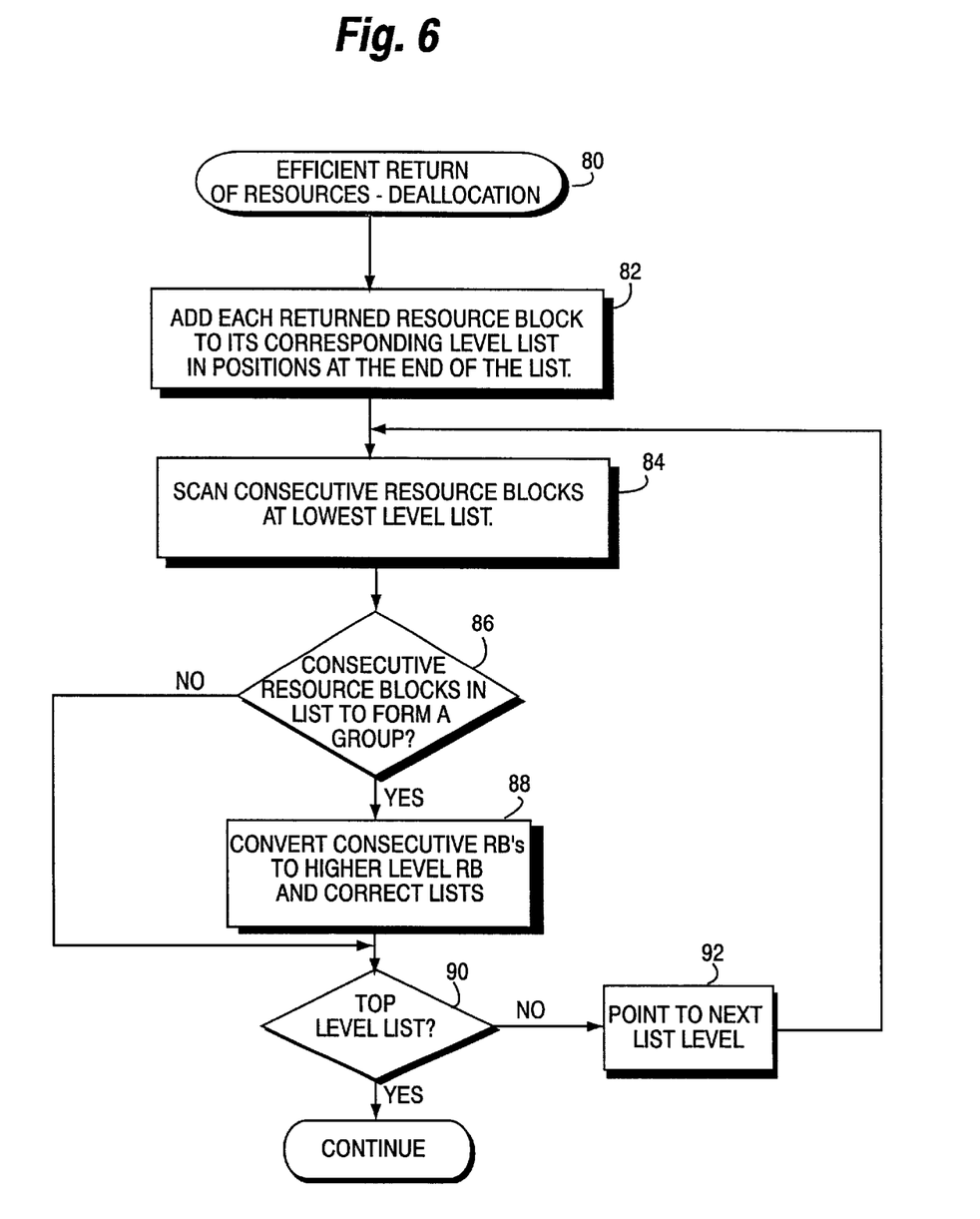
FIG. 6 is a flowchart diagram illustrating one set of example procedures for efficiently returning resources in accordance with one aspect of the present invention.

FIG. 6 illustrates an Efficient Return of Resources routine (block 80) implemented by the resource handler 11. Each returned resource block (RB) is added to its corresponding level list (block 82). If resource blocks are allocated at one end of a particular list in the hierarchy or other structure, then it is preferable to evenly distribute utilization of resource blocks by returning resource blocks to the opposite end of that list so that all of the other resources at that level will be used before the just-returned resource is used again. This technique for allocating and de-allocating resources circulates the resource blocks so that they are all used substantially uniformly.

Returning a resource block to the resource pool 12, the resource handler 11 scans consecutive resource blocks at the lowest level list (block 84). A decision is made (block 86) if the consecutive number of resource blocks in this list form a resource block group (block 86). If so, the resource handler 11 converts them into a higher level resource block and corrects the lists corresponding to both levels (block 88). A decision is made (block 90) if the top list level is reached. If not, the resource handler 11 points to the next list level in memory 11a (block 92) and control returns to block 84 to repeat the operations indicated in blocks 84–90. Thus, resource blocks are returned to the list and are grouped in such a fashion so that the highest level resource blocks can be made available.

Figure 6A:
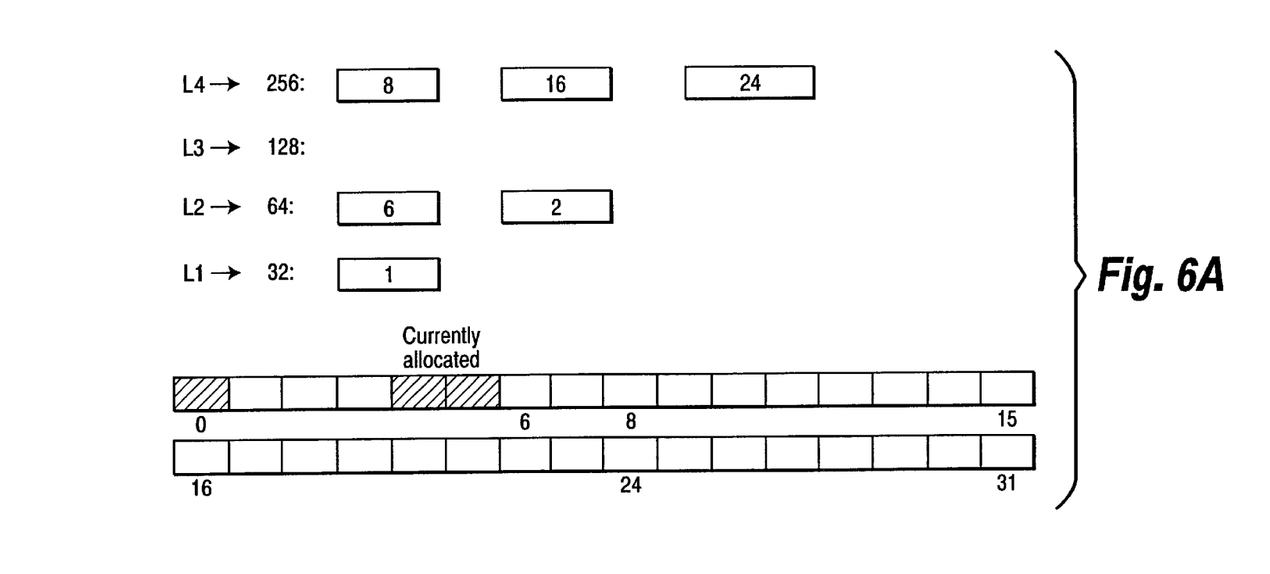
FIGS. 6A and 6B are example resource structures.
Figure 6B:
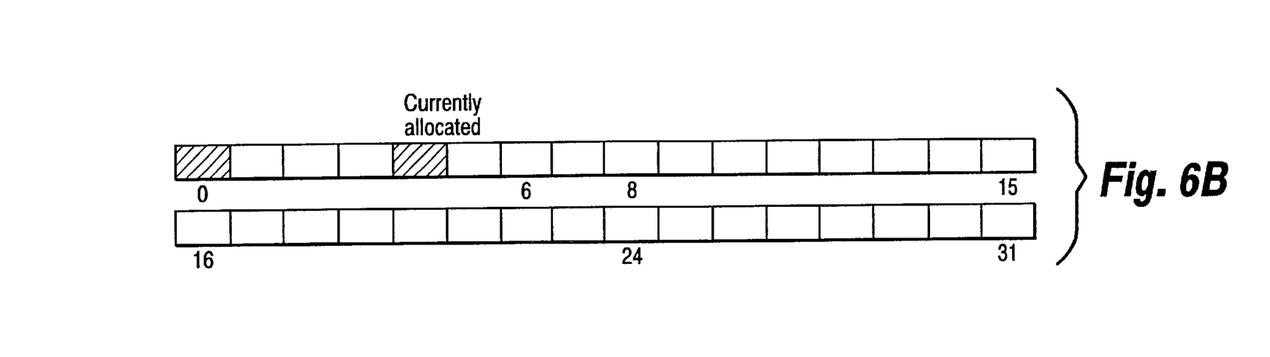

Consider the following illustrative example. If the resources to be allocated represent hardware equipment, for example, it is advantageous to spread the resource allocations over all the resources. In that way, all the hardware is periodically checked for functionality rather than only when there is a heavy load requiring allocation of most or all resource units. This may be accomplished using the method outlined above with respect to FIG. 6 above, by always allocating free resources at a front end of the list, and returning the resources to the back end. The example shown in FIG. 6A illustrates this. The resource at position 5 (one resource unit corresponding to capacity 32) is then returned to the last position in list L1. This leaves the free resources shown in FIG. 6B.

Figure 7:
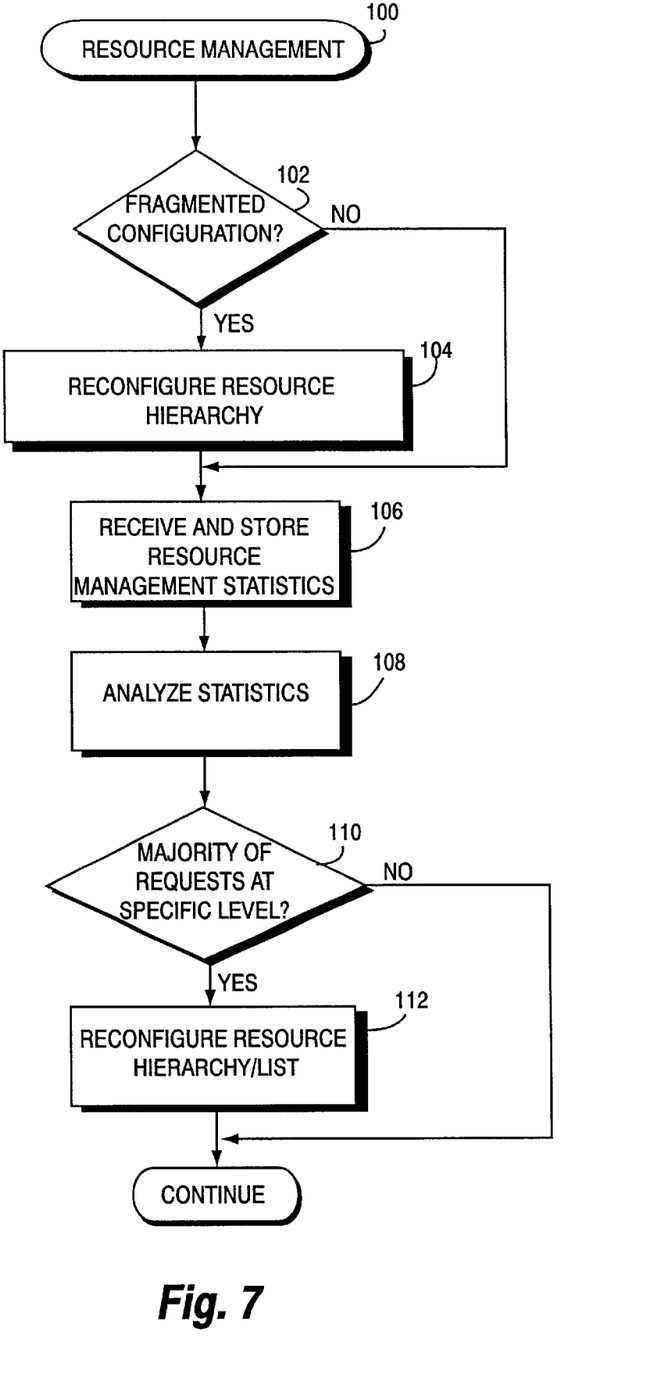
FIG. 7 is a flowchart diagram illustrating one set of example procedures for reconfiguring a resource structure in accordance with one aspect of the present invention.

The resource handler 11 also performs periodic resource management functions as will be explained in the example Resource Management routine (block 100) shown in FIG. 7. The resource handler 11 determines whether the resource pool configuration is currently fragmented (block 102). If so, the resource handler 11 reconfigures the resource hierarchy or other structure (block 104) to de-fragment the current configuration. Certain resource requests may be reallocated to different resource blocks in order to group resource blocks so that the greatest number of highest level resource blocks are made available as described above.

The resource handler 11 also periodically receives statistics from statistics analyzer 13 continually gathered by statistics analyzer data processor 13a and stored in corresponding memory 13b before being transferred to the resource handler memory 11a (block 106). The resource handler 11 periodically analyzes the accumulated statistics (block 108) and decides, based on that analysis, whether a majority of the resource requests are occurring at a specific resource block level. For example, while the resource hierarchy is generally reconfigured in order to make available the resource blocks of the highest possible level, it may be that most of the resource requests occur at a level below the highest resource block level. Thus, in a simple example where there are three levels of resource blocks, it may be that only a small number of level 3 resource blocks are requested and that level 2 resource blocks are the most popular. Accordingly, rather than reconfiguring the resource pool which causes some disruption (albeit likely minimal disruption) in service for those allocated resource blocks that are reallocated, the resource handler 11 reconfigures the resource hierarchy to create as many level 2 resource blocks as possible (block 112). If a request is later made for a higher level 3 resource block, the resource handler 11 will generate (if possible) a level 3 resource block at the time of that request by combining (again, if available) a complete level 2 resource block grouping to create a single level 3 resource block. This type of statistical analysis and reconfiguration minimizes disruptions to service and also reduces data processing overhead required in combining and dividing various resource block groupings to make available a higher level resource block.

Figure 8:
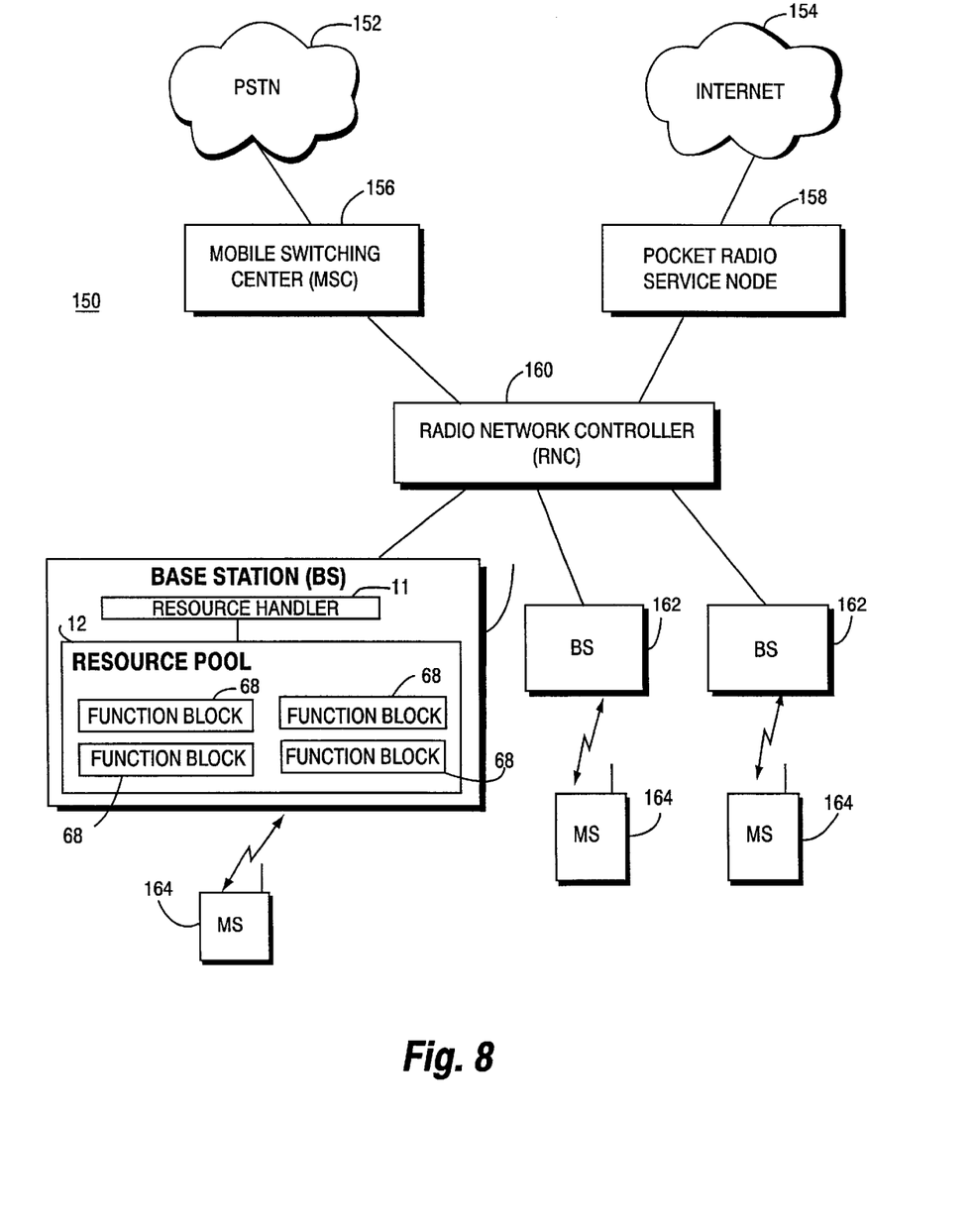
FIG. 8 is a function block diagram illustrating a radio communications system in which the present invention may be advantageously applied is a function block diagram illustrating a set of procedures for efficiently returning resources to the resource pool in accordance with one preferred but nevertheless example embodiment of the present invention.

While the present invention may be advantageously applied to many environments, one example environment is portable radio communications. FIG. 8 illustrates in function block diagram format a portable radio communications system 150. Mobile switching center (MSC) 156 interfaces a public switched telephone network (PSTN) 152 to the mobile communications network 150. A packet radio service node 158 interfaces data communications from the Internet 154 with the mobile radio communications system. Both the MSC 156 and packet radio service node 158 are coupled to a radio network controller (RNC) 160. Although only one RNC is shown for purposes of simplified illustration, those skilled in the art will appreciate that more than one RNC may be employed. The radio network controller 160 is coupled to a plurality of base stations (BS) 162. Portable radios illustrated as mobile stations (MS) 164 communicate over an air interface with one or more base stations 162 using a variety of protocols and procedures known to those skilled in the radio communications art.

Each base station includes (among other things) a resource handler 11 and resource pool 12 such as those shown in FIG. 8. Resource pool 12 is comprised of function blocks 68 where each function block is divided into various resource units that can be uniquely addressed and allocated to support various services provided by the portable radio communications system 150. The function blocks 68 in resource pool 12 can correspond to hardware and/or software resources required, for example, to assign radio channels to provide radio communications with the mobile stations 164.

Depending upon parameters of a particular call setup, more or less resources are required for the call. For instance, if the call is a basic voice communication, a smaller number of resource units is required than for a more complicated call, e.g., a multimedia call including voice, data, video, etc. Even among data calls there are different bandwidth requirements for high speed and low speed data calls with higher bandwidth data calls requiring more resource units than lower bandwidth data calls.

To accommodate wireless, multimedia communications, efficient resource unit allocation and return must be achieved so that multimedia and other high bandwidth calls requiring higher level resource blocks can be handled as well as lower level resource blocks associated with less demanding calls. A preferred access methodology that accommodates multimedia and other high demand communications services is wide-band code division multiple access (WCDMA). Calls are allocated across a very wide frequency bandwidth, e.g., 5, 10, 15, etc. MHz, using orthogonal spreading codes, where one or more codes are assigned to each call. Each orthogonal spreading code is an example of a software-type resource block. Each base station is assigned a limited number of spreading codes.

Figure 9:
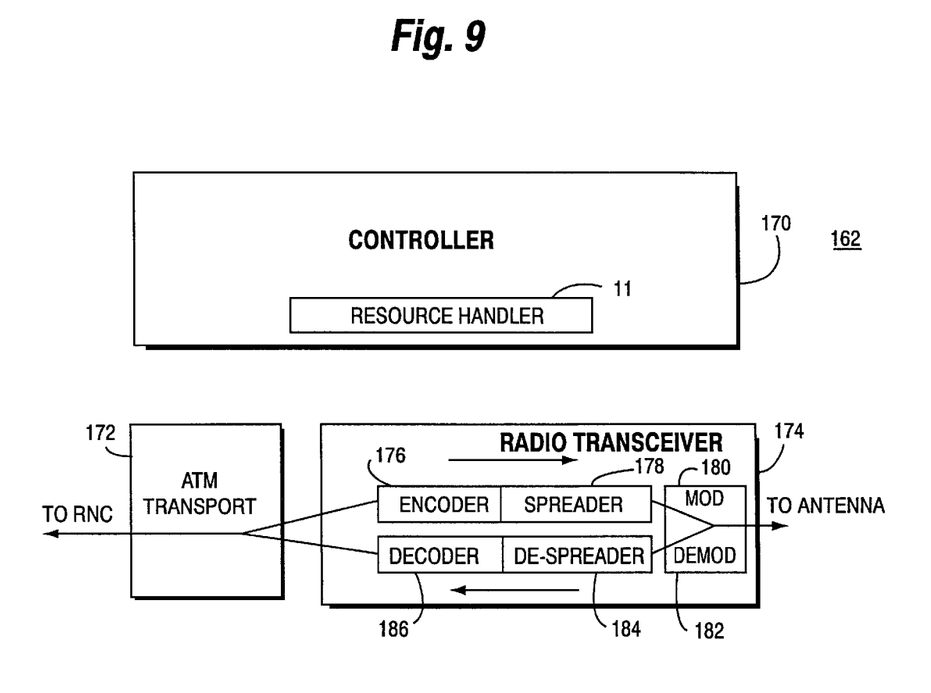
FIG. 9 is a function block diagram illustrating in further detail an implementation of the present invention in a base station in a wideband code division multiple access radio communications system in accordance with one preferred but example embodiment of the present invention.

Assuming that the mobile communications system 150 is a WCDMA system, the base station 162 in FIG. 9 may include a controller 170, an asynchronous transfer mode (ATM) transport 172, and a radio transceiver 174. An ATM transport interface to the radio network controller 160 is preferred because of its high efficiency and throughput. Controller 170 includes among other things a resource handler 11 and statistics analyzer 13 such as those shown in FIG. 3. The radio transceiver 174 includes a number of function resource blocks such as an encoder 176, a CDMA spreader 178, a modulator 180 for radio transmissions to the mobile stations 164. Additional function resource blocks are employed in the form of a demodulator 182, a CDMA de-spreader 184, and a decoder 186 for demodulating, de-spreading, and decoding radio transmissions from mobile stations 164.

Each function resource block corresponds to one or more hardware and/or software resource units, where a resource unit is an integral functional unit having a unique address that can be individually addressed and operated. For example, an encoder employs both hardware and software resource units. When a resource unit is allocated to a resource request, it is enabled and can then process data input provided by the requester.

The resource handler 11 maintains a "picture" of the resource units in a list data structure having a corresponding list for each free resource block level in its memory 11a. Each record/entry in a list represents one free resource block and may include information such as the type of resource unit (e.g., spreading code, encoder, modulator, etc.), resource unit address, current configuration, current state (enabled/disabled), etc.

When setting up a path for a call through the base station 162, one or more resource units from the various different function blocks 176–186 must be allocated. For a relatively simple voice call/path through the base station, an 8 kbps corresponding to a 32 kilosymbol per second (ksps) might use one encoder resource unit. The relationship between bit rate and symbol rate depends upon the particular coding employed in the encoder. On the other hand, a 64 ksps path might require two encoder resource units.

Figure 10A:
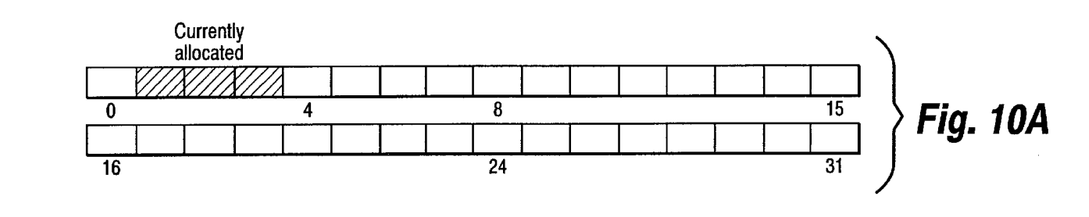
FIGS. 10A–10M are example resource structures.
Figure 10B:
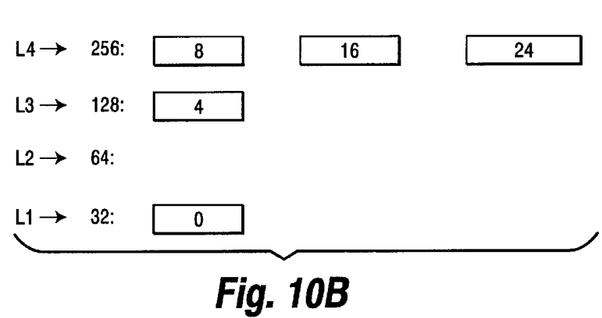

Consider an example where there are four resource block levels with level 1 corresponding to 32 ksps resource blocks, level 2 corresponding to 64 ksps resource blocks, level 3 corresponding to 128 ksps resource blocks, and level 4 corresponding to 256 ksps resource blocks. A list is maintained for each level L1–L4. As described above, if a list at a particular level is empty, the resource handler moves to the next level and converts an available resource block into plural resource blocks at the next lower level. In this example, the base station 162 includes 32 resource units. A map of the free resource units at a particular time is shown in FIG. 10A with shaded blocks corresponding to currently allocated resource units, each block is identified by an index with indices 0, 4, 8, 15, 16, 24, and 31 being shown. Note that resource blocks 1, 2, and 3 are currently allocated. As mentioned above, one 32 ksps channel requires allocation of one resource unit or one of the 32 blocks. A 64 ksps channel requires two resource units and therefore must be assigned starting with index/address 0, 2, 4, . . . 28 or 30. A 128 ksps channel requires four consecutive resource units starting with index positions 0, 4, 8, . . . 24, or 28. A 256 ksps channel requires eight consecutive resource units starting with index positions 0, 8, 16, or 24. Assuming that resource units are configured to provide the largest number of highest level groups as possible produces the resource structure shown in FIG. 10B.

Figure 10C:
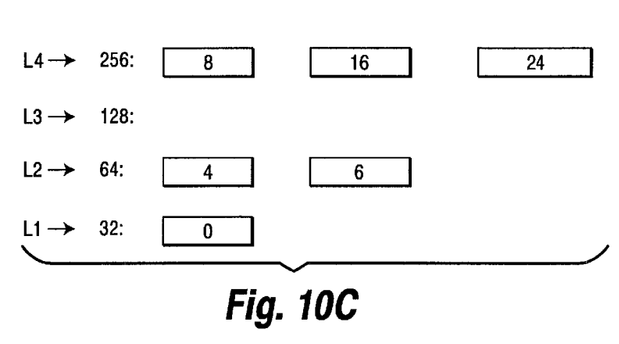
Figure 10D:
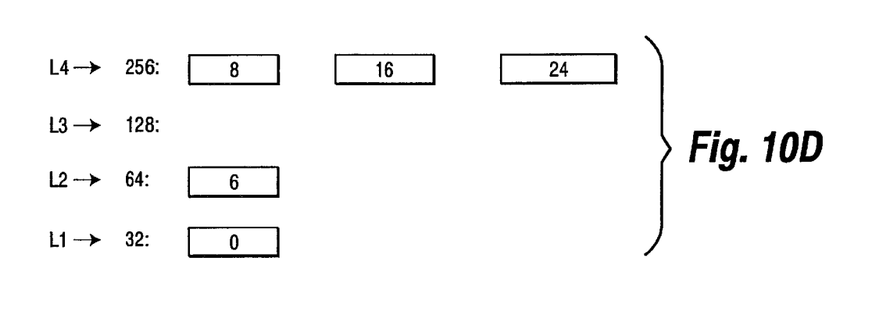
Figure 10E:
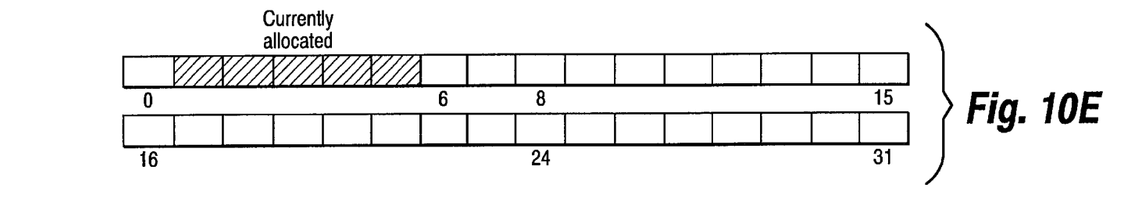

Following the above example, a request for a 64 ksps channel means that the resource handler 11 scans the level 2 (L2) list. Since the L2 list is empty, the resource handler 11 converts a 128 ksps resource block into two 64 ksps resource blocks starting at index 4 which results in the resource structure shown in FIG. 10C. The conversion provides two 64 ksps blocks at indexes 4 and 6. The 64 ksps block at index 4 is allocated (i.e., because it is first in the L2 list) and removed from the L2 list resulting in the resource structure shown in FIG. 10D. The current resource map is then as shown in FIG. 10E.

When resource units are returned (de-allocated), the resource units are placed last in the appropriate level list, i.e., the list having resource blocks of the same size. The resource manager 11 scans the list for consecutive resource blocks, and when the requisite number of consecutive resource blocks is detected, a next level resource block is created.

Figure 10F:
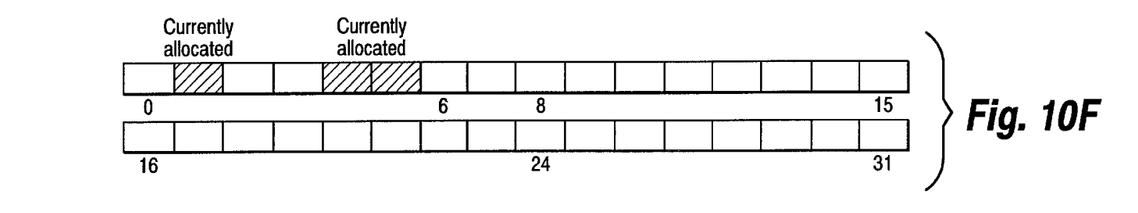
Figure 10G:
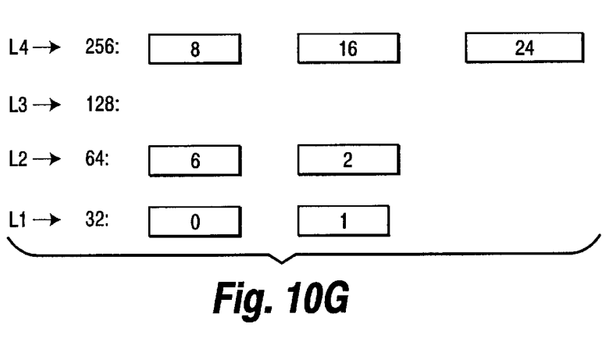
Figure 10H:
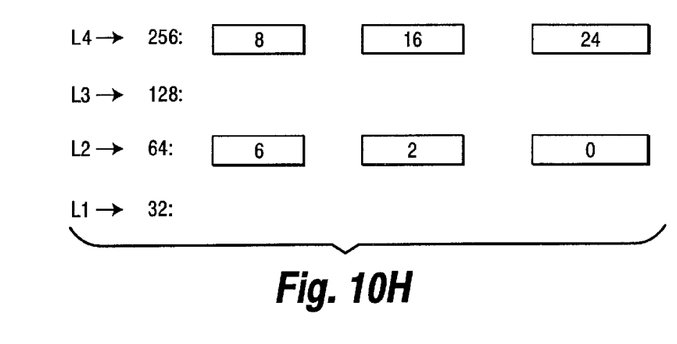
Figure 10I:
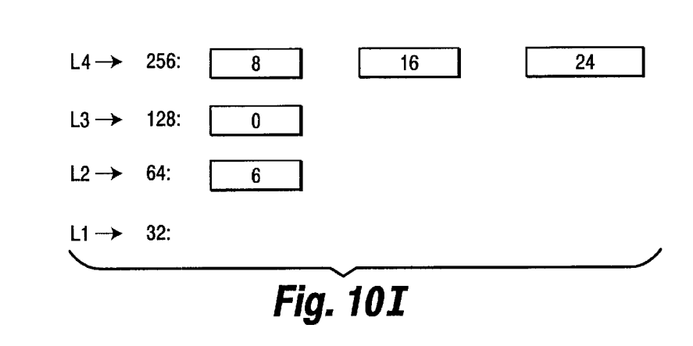
Figure 10J:
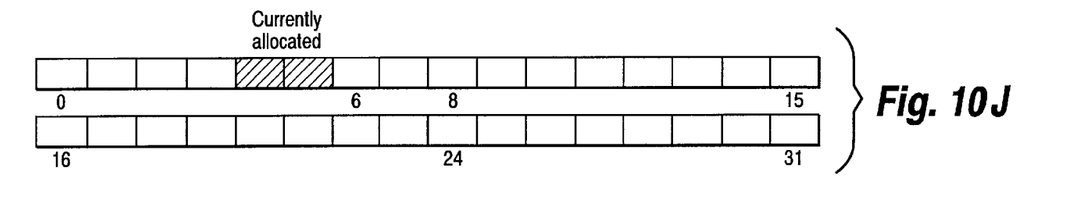

Consider for example the return of a 32 ksps resource block to the list of free 32 ksps resource blocks. Also assuming that the groupings include two resource blocks, if two consecutive 32 ksps resource blocks are in the list, the resource handler 11 creates a single 64 ksps resource block and deletes the two 32 ksps resource blocks from their respective lists. Consider the example map of free resource blocks at the base station 162 shown in FIG. 10F having as mentioned above a total number of 32 resources. Assume that the 32 ksps resource block at index position 1 is returned to the resource pool. The resource handler 11 enters that resource block last into the list of free 32 ksps resource blocks resulting in a resource structure shown in FIG. 10G. The resource handler 11 then scans this list for two consecutive resource blocks that can be grouped together to form a 64 ksps resource block as shown in FIG. 10H. The resource handler 11 also scans for consecutive resource blocks in the 64 ksps resource block list. Since the two resource blocks start at zero and are consecutive, they are grouped together to form a 128 ksps resource block as shown in FIG. 10I. The resource handler 11 scans for consecutive resource blocks in the 128 ksps resource block list. Since there is only one resource block in this particular list, a 256 ksps resource block cannot be formed. The resource map after that allocation is as shown in FIG. 10J.

Figure 10K:
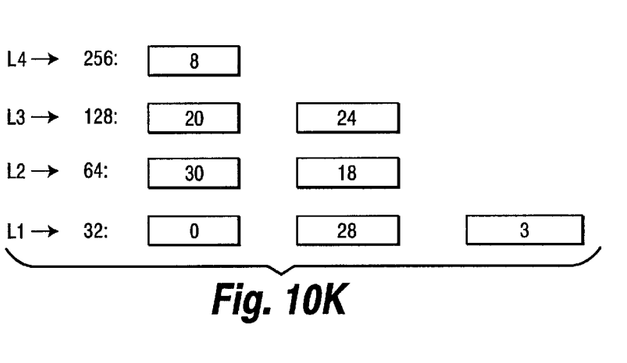

Such a list structure is also particularly advantageous in de-fragmenting the resource structure. The resource blocks to be moved are usually the resource blocks at lower level lists. Starting with the lowest level 32 ksps resource blocks, allocated resource blocks are moved to create as few larger level resource blocks as possible using the smallest number of de-allocations. Consider the example of fragmented resources shown in FIG. 10K. This configuration of fragmented resources is perhaps easier seen in the resource structure map in FIG. 10L.

Figure 10L:
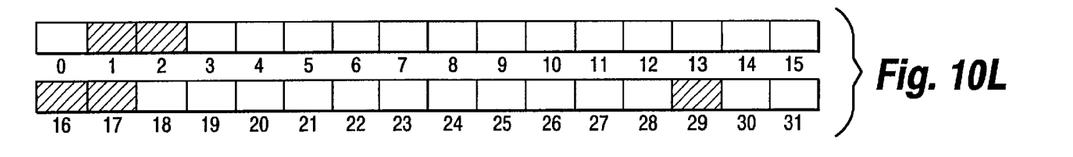

The resource structure may be more efficiently configured if the currently allocated 32 ksps resource blocks at index positions 1, 2, and 29 are allocated adjacent one another to make available larger resource blocks at their current respective positions. The first resource element at index position zero could be used to create a 64 ksps resource block if the 32 ksps allocation at index position 1 is moved to another index position. Accordingly, that 32 ksps allocation is moved logically to a buffer of allocated resources to be relocated. The lists for each level are processed in the same fashion except the highest level at 256 ksps.

Figure 10M:
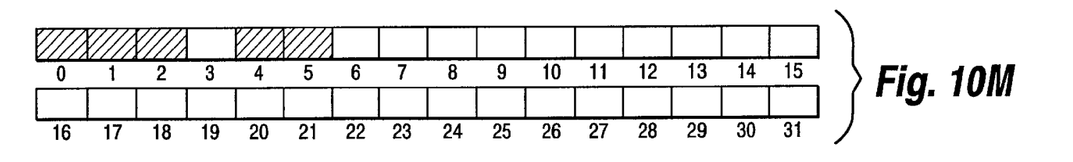

The resource units are reassembled minimizing the number of resource blocks that have to be moved. Each 256 ksps resource block is examined to determine how many resource blocks need to be moved to complete that 256 ksps resource block. In this example, only two blocks from positions 16 and 29 need to be moved to the first position (starting at index position 0) of the first 256 ksps blocks. After de-fragmentation, the 32 ksps resource blocks have been re-located to adjacent index positions 0, 1, and 2. The 64 ksps resource block now occupies index positions 4 and 5. The resource structure map appears as shown in FIG. 10M.

While the invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method comprising the steps of:
    configuring a data structure corresponding to a pool of resource units including:
        first resource blocks, each corresponding to one or more resource units, provided in groups of first resource blocks and forming a first, lowest level of the resource unit pool, and
        second resource blocks, each second resource block corresponding to one of the groups of the first resource blocks, provided in groups of second resource blocks and forming a second, higher level of the resource unit pool;
    receiving a first request for a resource; and
    allocating an available first resource block from one of the first resource block groups in which one of the first resource blocks is already allocated.

2. The method in claim 1, further comprising:
    if no first resource block is available from one of the first resource block groupings in which one of the first resource blocks is already allocated, allocating an available one of the first resource blocks from another of the first resource block groupings.

3. The method in claim 2, wherein the pool of resource units further includes:
    third resource blocks, each third resource block corresponding to one of the groups of the second resource blocks, provided in groups of second resource blocks and forming a third higher level,
    the method further comprising:
        if no first resource block is available from the first or the second resource block groupings, allocating one of the first resource blocks from one of the third resource blocks.

4. The method in claim 3, further comprising:
    receiving a second request from one of the second resource blocks, and
    allocating an available second resource block from one of the second resource block groupings in which one of the second resource blocks is already allocated.

5. The method in claim 4, further comprising:
    if no second resource block is available from any of the second resource block groupings in which one of the second resource blocks is already allocated, allocating an available one of second resource blocks from another of the second resource block groupings.

6. The method in claim 1, further comprising:
    restoring a returned first resource block to a first resource block grouping in which one of the first resource blocks is already allocated.

7. The method in claim 1, further comprising:
    allocating resource blocks from one part of the resource unit pool, and
    restoring returned resource blocks from another part of the resource unit pool.

8. The method in claim 1, further comprising:
    reorganizing the resource unit pool by moving first resource blocks from one grouping to another grouping to create an additional second resource block.

9. The method in claim 8, wherein the reorganizing step is performed only when there is a request for one of the second resource blocks and no second resource block is currently available.

10. The method in claim 1, further comprising:
    determining which level in the resource unit pool receives a greater number of requests, and
    reorganizing the resource unit pool by moving resource blocks from one grouping to another grouping to create an additional higher level resource block up to the determined level.

11. A method comprising the steps of:
    configuring a data structure corresponding to a pool of data processing resource units as a hierarchy including:
        first resource blocks, each corresponding to one of individual resource units,
        forming a first lowest level of the hierarchy, and
        second resource blocks, each second resource block corresponding to a group of the first resource blocks,
    forming a second, higher level of the hierarchy;
    receiving a request for a resource unit;
    allocating one of the first resource blocks available at the first level of the hierarchy; and
    if no first resource block is available at the first level of the hierarchy, converting one of the second resource blocks at the second level of the hierarchy into plural first resource blocks at the first level of the hierarchy, and allocating one of the converted first resource blocks.

12. The method in claim 11, wherein the data structure corresponding to the pool of resource units further includes:
third resource blocks, each third resource block corresponding to one group of the second resource blocks, forming a third, higher level of the hierarchy, the method further comprising:
if no first resource block is available at the first or the second levels of the hierarchy,
converting one of the third resource blocks at the third level of the hierarchy into plural second resource blocks at the second level of the hierarchy,
converting the converted second resource block at the second level of the hierarchy into plural converted resource blocks at the first level of the hierarchy, and allocating one of the converted first resource blocks.

13. The method in claim 11, further comprising:
restoring a returned first resource block first to a first resource block grouping at the first level of the hierarchy in which one of the first resource blocks is already allocated,
if the returned first resource block completes a first resource block grouping in the first level of the hierarchy, converting the completed, first resource block grouping to a second resource block at the second level of the hierarchy.

14. A communications system, comprising:
a pool of communications resource units configured in a structure having plural levels including:
first resource blocks, each first resource block corresponding to an individual resource unit, provided in groups of first resource blocks and forming a first, lowest level, and
second resource blocks, each second resource block corresponding to one of the first groupings of the first resource blocks, forming a second level above the first level; and
a communications resource manager configured to allocate ones of the first and second resource blocks in response to communication resource requests to periodically reorganize resource blocks by moving one or more lower level resource blocks from one grouping to another grouping to create an additional higher level resource block.

15. The communications system in claim 14, wherein the communications resource manager is configured to reorganize the structure only when there is a request for a higher level resource and no higher level resource is currently available.

16. The communications system in claim 14, wherein the communications resource manager is configured to reorganize using a minimal number of moves of lower level resource blocks from one grouping to another grouping to create the additional higher level resource block.

17. The communications system in claim 14, wherein the communications resource manager is configured to allocate available resource blocks from one part of the structure and to restore returned communications resource blocks from another part of the structure.

18. The communications system in claim 14, wherein the pool of communications resource units includes:
third resource blocks, each third resource block corresponding to a second grouping of the second resource blocks, forming a third level above the second level, and
wherein the communications resource manager is configured to allocate resource blocks so that a greatest number of higher level resources are maintained for allocation.

19. The communications system in claim 14, wherein the pool of communications resource units includes:
third resource blocks, each third resource block corresponding to a second grouping of the second resource blocks, forming a third level above the second level, and
wherein the communications resource manager is configured to restore returned resource blocks to create a greatest number of available higher level resources.

20. A communications system, comprising:
a pool of communications resource units configured using a list data structure stored in a memory, the pool of communications resource units having plural levels in a hierarchy including:
first resource blocks, each first resource block corresponding to an individual resource unit, provided in groups of first resource blocks and forming a first, lowest level of the hierarchy, where the list data structure includes a first list storing a corresponding data record for each available, first resource block, and
second resource blocks, each second resource block corresponding to a first grouping of the first resource blocks, forming a second level of the hierarchy above the first level, where the list data structure includes a second list storing a corresponding data record for each available, second resource block;
a communications resource manager configured to allocate ones of the first and second resource blocks in response to communication resource requests, to remove allocated resource blocks from a corresponding list, and to periodically reorganize one or more of the first and second lists by moving one or more lower level resource blocks from one list position to another list position.

21. The communications system in claim 20, wherein the communications resource manager is configured to move one or more lower level resource blocks from one list position to another list position.

22. The communication system according to claim 20, wherein the pool of communications resource units configured using the list data structure includes:
third resource blocks, each third resource block corresponding to a second grouping of the second resource blocks, forming a third level of the hierarchy above the second level, where the list data structure includes a third list storing a data record for each available, third resource block.

23. The communications system in claim 20, wherein the communications resource manager is configured to reorganize one or more of the first and second lists using a minimal number of moves of lower level resource blocks from one grouping to another grouping to create an additional higher level resource block.

24. The communications system in claim 20, wherein the communications resource manager is configured to allocate available resource blocks from one part of one of the first and second lists and to restore returned communications resource blocks from another part of that list.

25. The communications system in claim 20, wherein the communications resource manager is configured to allocate resource blocks so that a greatest number of higher level resources are maintained for allocation.

26. The communications system in claim 20, wherein the communications resource manager is configured to restore returned resource blocks to create a greatest number of available higher level resources.

27. A communications system, comprising:
  a pool of communications resource units configured using a data structure having plural levels including resource blocks formed at plural levels in the data structure, where different resource blocks are logically linked in the data structure to form various groupings;
  a communications resource manager is configured to analyze a communications request and allocating one or more of the resource blocks; and
  a request monitor is configured to monitor the number of requests for communication resources at each level in the data structure and to select a level that receives a greater number of requests,
  wherein the communications resource manager is configured to reorganize the data structure by moving resource blocks from one grouping to another grouping to create additional resource blocks at the selected level.

28. The communications system in claim 27, wherein the communications resource manager is configured to reorganize the data structure using a minimal number of moves of resource blocks from one grouping to another grouping.

29. The communications system in claim 27, wherein the communications resource manager is configured to create a higher level resource above the selected level of the data structure when the higher level resource is specifically requested.

30. A communications system, comprising:
  a pool of communications resource units including:
    first resource blocks forming a first, lowest level, each first resource block corresponding to one individual resource unit;
    second resource blocks forming a second higher level, each second resource block logically linked to a group of first resource blocks, and
  a communications resource manager configured to analyze a communications request such that if the request is for a first resource block, to allocate to the communications request one of the first resource blocks available at the first level, and if one of the first resource blocks is not available at the first level, to convert an available one of the second resource blocks at the second level into a group of available first resource blocks, and to allocate one of the converted first resource blocks to the communications request.

31. The communications system of claim 30, further comprising:
  third resource blocks forming a third higher level, each third resource block linked to a group of second resource blocks,
  wherein if first resource is not available at the first and second levels, the communications resource manager is configured to convert an available third resource block at the third level into a group of newly-available second resource blocks, converts one of the newly-available second resource blocks into a group of newly-available first resource blocks, and allocates one of the converted first resource blocks from the newly-available first resource blocks to the communications request.

32. The communications system in claim 30, wherein the communications system is a radio communications system and the communications resource units include digital signal processors (DSP) and each DSP corresponds to one or more communication resource units.

33. The communications system in claim 30, wherein the communications system is a radio communications system and the communications resource units include radio transmitter circuit boards, radio receiver boards, and signal processing boards, wherein each board corresponds to one or more communication resource units.

34. The communications system in claim 30, wherein the communications system is a code division multiple access (CDMA) radio communications system and the pool of communication resource units includes CDMA spreading codes.

35. The communications system in claim 30, wherein the resource manager is configured to allocate resource blocks so that a greatest number of higher level resources are maintained available for allocation.

36. The communications system in claim 30, wherein one of the first resource blocks from a corresponding group of first resource blocks is available if another one of the first resource blocks from the corresponding group of first resource blocks is currently allocated.

37. The communications system in claim 30, wherein the first and second resource blocks are configured in a hierarchy and the resource manager is configured to allocate resource blocks from one part of the hierarchy and to restore returned resource blocks to another part of the hierarchy.

* * * * *